(12) United States Patent
Yano

(10) Patent No.: US 12,534,413 B2
(45) Date of Patent: Jan. 27, 2026

(54) HARD COMPOSITE MATERIAL

(71) Applicant: MITSUBISHI MATERIALS CORPORATION, Tokyo (JP)

(72) Inventor: Masahiro Yano, Naka (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 716 days.

(21) Appl. No.: 17/910,921

(22) PCT Filed: Mar. 9, 2021

(86) PCT No.: PCT/JP2021/009256
§ 371 (c)(1),
(2) Date: Sep. 12, 2022

(87) PCT Pub. No.: WO2021/182462
PCT Pub. Date: Sep. 16, 2021

(65) Prior Publication Data
US 2023/0174430 A1 Jun. 8, 2023

(30) Foreign Application Priority Data

Mar. 13, 2020 (JP) .................................. 2020-043693

(51) Int. Cl.
*C04B 35/5831* (2006.01)
*C04B 35/626* (2006.01)
(Continued)

(52) U.S. Cl.
CPC ...... *C04B 35/5831* (2013.01); *C04B 35/6261* (2013.01); *C04B 35/6264* (2013.01);
(Continued)

(58) Field of Classification Search
CPC .............. C04B 35/5831; C04B 35/645; C04B 2235/3217; C04B 2235/3232;
(Continued)

(56) References Cited

U.S. PATENT DOCUMENTS 5,328,875 A 7/1994 Ueda et al.
5,466,642 A * 11/1995 Tajima ................ C04B 35/5831
501/87

(Continued)

FOREIGN PATENT DOCUMENTS

CN 106132604 A 11/2016
EP 0598140 B1 3/1998
(Continued)

OTHER PUBLICATIONS

Supplementary European Search Report mailed Mar. 15, 2024, issued for European Patent Application No. 21768654.2.

*Primary Examiner* — Laura A Auer
(74) *Attorney, Agent, or Firm* — Troutman Pepper Locke LLP; James E. Armstrong, IV; Nicholas J. DiCeglie, Jr.

(57) ABSTRACT

A cBN sinter comprising cubic boron nitride grains and a binder phase, the binder phase comprising $Ti_2CN$ and $TiAl_3$, wherein the ratio $I_{Ti2CN}/I_{TiAl3}$ of the peak intensity $I_{Ti2CN}$ of $Ti_2CN$ appearing at $2\theta=41.9°$ to $42.2°$ to the peak intensity $I_{TiAl3}$ of $TiAl_3$ appearing at $2\theta=39.0°$ to $39.3°$ is in a range of 2.0 to 30.0 in an XRD measurement.

3 Claims, 1 Drawing Sheet

(51) Int. Cl.
*C04B 35/645* (2006.01)
*C04B 35/65* (2006.01)

(52) U.S. Cl.
CPC .......... *C04B 35/645* (2013.01); *C04B 35/652* (2013.01); *C04B 2235/3217* (2013.01); *C04B 2235/3232* (2013.01); *C04B 2235/3856* (2013.01); *C04B 2235/386* (2013.01); *C04B 2235/3886* (2013.01); *C04B 2235/404* (2013.01); *C04B 2235/604* (2013.01); *C04B 2235/656* (2013.01); *C04B 2235/6581* (2013.01); *C04B 2235/663* (2013.01); *C04B 2235/785* (2013.01); *C04B 2235/786* (2013.01)

(58) Field of Classification Search
CPC ...... C04B 2235/3856; C04B 2235/386; C04B 2235/785; C04B 2235/786; C04B 2235/38; C04B 2235/3813; C04B 2235/3865; C04B 2235/5436; C04B 2235/80

See application file for complete search history.

(56) References Cited

U.S. PATENT DOCUMENTS

| | | |
|---|---|---|
| 2007/0032369 A1 | 2/2007 | Franzen |
| 2012/0055099 A1 | 3/2012 | Bao et al. |
| 2017/0101346 A1 | 4/2017 | Yumoto et al. |

FOREIGN PATENT DOCUMENTS

| | | |
|---|---|---|
| EP | 3124145 A1 | 2/2017 |
| EP | 4289987 A1 | 12/2023 |
| EP | 4296246 A1 | 12/2023 |
| JP | S53-89809 A | 8/1978 |
| JP | H04-240006 A | 8/1992 |
| JP | H05-17233 A | 1/1993 |
| JP | H05-310474 A | 11/1993 |
| JP | 2004-107154 A | 4/2004 |
| JP | 2007-39329 A | 2/2007 |
| JP | 2013-537116 A | 9/2013 |

* cited by examiner

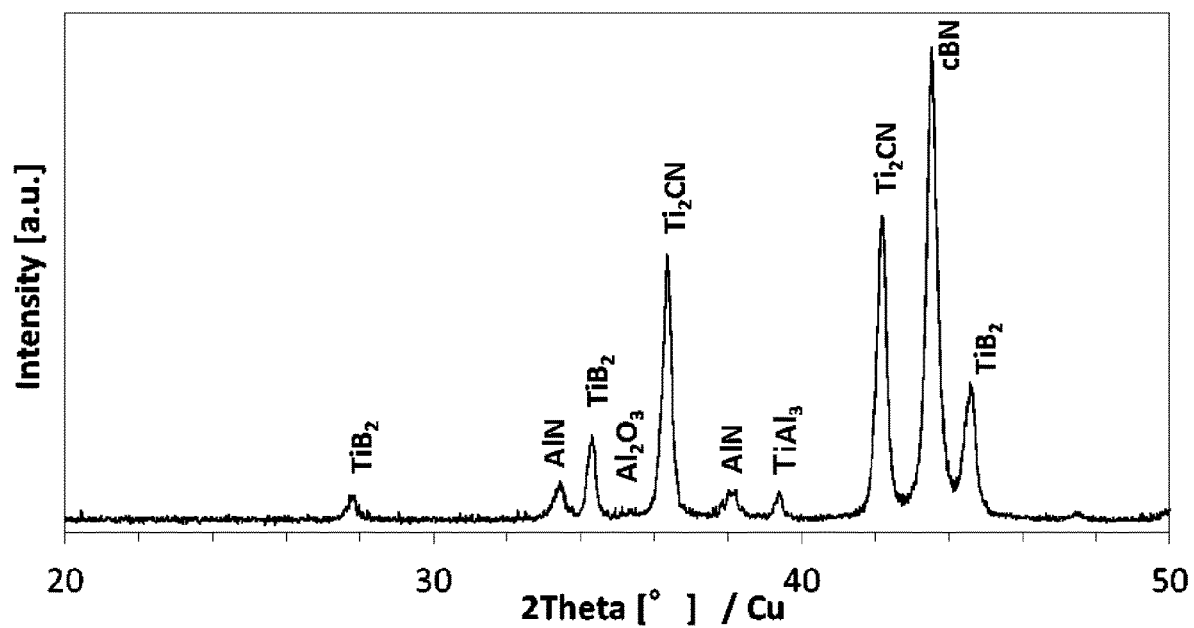

HARD COMPOSITE MATERIAL

TECHNICAL FIELD

The present invention relates to a hard composite material, in particular, suitable for drilling tips for drilling tools. This application claims priority benefit of Japanese Patent Application No. 2020-043693 filed on Mar. 13, 2020. The entire contents of the Japanese application are hereby incorporated by reference herein.

BACKGROUND ART

WC-based cemented carbides, which exhibit high hardness and excellent toughness, are being used in drilling tips for drilling tools in addition to cutting tools. Cubic boron nitride sinters (hereinafter referred to as cBN sinters), which have low reactivity with Fe- and Ni-based materials, are being used in drilling tips for drilling tools in addition to cutting tools in iron and nickel mines, despite its inferior hardness compared to diamond. Proposals thus have been made to improve the cutting and drilling performance of these WC-based cemented carbides and cBN sinters.

For example, Patent Literature 1 discloses cemented carbide for cutting edges of tools for high depth drilling including ferrous metals, WC, and TiCN.

Patent Literature 2 discloses a cBN sinter to be used for cutting tools or wear-resistant tools, in which the surface of a binder phase forming material of $Ti_2AlC$ is activated to facilitate the reaction between the cBN and the binder phase, thereby forming a second layer including a first layer containing titanium and boron on the surface of each cBN grains and a second layer containing aluminum and boron on the entire surface of the first layer for enhancing the adhesion between the cBN and the binder phase and improving the strength and toughness of the sinter.

Patent Literature 3 discloses a self-sintered polycrystalline cubic boron nitride compact including a first phase of cBN grains and a ceramic binder phase containing a titanium compound, wherein the first phase accounts for more than 80% by volume of the boron compact and the binder precursor is $Ti_2AlC$. Since the compact contains a binder phase with electrical conductivity or semi-conductivity, and thus the cBN sintered compact has excellent machinability in electric discharge machining.

CITATION LIST

Patent Literature

[PTL 1] Japanese Unexamined Patent Application Publication No. Sho53-89809
[PTL 2] Japanese Unexamined Patent Application Publication No. Hei5-310474
[PTL 3] Japanese Unexamined Patent Application Publication No. 2013-537116

SUMMARY OF INVENTION

Technical Problem

An object of the present invention, which was made in view of the aforementioned circumstances and disclosures, is to provide a hard composite material having excellent fatigue wear resistance and abrasive wear resistance, and also having resistance to damage such as fracture due to impact and vibration applied to destroy a rock, even when the hard composite material is used as a drilling tool.

Solution to Problem

A cBN sinter according to an embodiment of the present invention comprises cubic boron nitride grains and a binder phase,
the binder phase comprising $Ti_2CN$ and $TiAl_3$, wherein the ratio $I_{Ti2CN}/I_{TiAl3}$ of the peak intensity $I_{Ti2CN}$ assigned to $Ti_2CN$ appearing at $2\theta=41.9°$ to $42.2°$ to the peak intensity $I_{TiAl3}$ assigned to $TiAl_3$ appearing at $2\theta=39.0°$ to $39.3°$ is in a range of 2.0 to 30.0 in an XRD measurement.
The cBN sinter according to the embodiment may satisfy Condition (1):
(1) The binder phase comprises dispersed $Al_2O_3$ grains having a mean grain size ranging from 0.9 μm to 2.5 μm.

Advantageous Effects of Invention

As described above, a cBN sinter has excellent fatigue wear resistance and abrasive wear resistance, and also has resistance to damage such as fracture due to impact and vibration applied to destroy a rock, even when the hard composite material is used as a drilling tool.

BRIEF DESCRIPTION OF DRAWINGS

FIG. 1 is an XRD spectrum of Example Sinter 3.

DESCRIPTION OF EMBODIMENTS

The inventor has reviewed the disclosures described in the patent documents and has found the following facts:

The cemented carbide described in PTL 1 is designed for drilling in a highly corrosive atmosphere, albeit for high depth drilling; hence, it has poor wear resistance in deep drilling of hard rocks, and it wears early and has a short service life in use in a cutting edge of a drilling tool.

Since the cBN sinters disclosed in PTL 2 and PTL 3 are designed to be pressed mainly against a work material of uniform composition, they exhibit insufficient resistance to fatigue wear due to repeated impacts, to abrasive wear caused by the micro-cutting action occurring when a hard component invades between the tool cutting edge and the rock in the fractured rock, and to damage such as fracture due to impact and vibration to destroy the rock when used as drilling tools for rock excavation.

A drilling tool is used for digging into the ground or bedrock. Underground rocks are not uniform in composition and strength, and are brittle materials. Unlike cutting tools, which focus on cutting and scraping performance, drilling tools need to withstand shock and vibration to destroy the rock, and also need to withstand rotation to efficiently remove the destroyed rock.

In other words, materials for drilling tools requires resistance to damage such as fatigue wear caused by repeatedly applied impacts, abrasive wear caused by the micro-cutting action occurring when the hard component of the crushed rock invades between the tool cutting edge and the crushed rock surrounding the drilling tool, and fracture due to impacts and vibration to destroy the rock.

The inventor has carried out an intensive study based on these facts. The inventor, who has focused on a cBN sinter as a hard composite material, has found that the cBN sinter exhibits excellent fatigue wear resistance and abrasive wear resistance, as well as resistance to damage such as fracture due to impact and vibration to break rocks, if a predetermined relation holds between the peak intensities of the XRD measurements of $Ti_2CN$ and $TiAl_3$, which constitute the binder phase of the cBN sinter.

The cBN sinter according to the embodiments of the present invention will now be described in more detail. Throughout the specification and claims, a numerical range expressed as "A to B" (A and B are both numerical values) is synonymous with "A or above and B or below," and the range includes the upper limit value (B) and the lower limit value (A). The units for the upper and lower limits are the same. In addition, the numerical values may include experimental errors.

Mean Size of Cubic Boron Nitride (cBN) Grains:

The cBN grains used in this embodiment may have any mean grain size. The preferred mean grain size ranges from 0.5 to 30.0 μm.

The reason for excellent fracture resistance is as follows: In addition to an increase in chipping resistance by hard cBN grains contained in the sinter, a mean grain diameter of 0.5 to 30.0 μm leads to, for example, not only decreases in defects and chipping originating from the uneven shape of the cutting edge caused by detachment of cBN grains from the surface of a drilling tool during use, but also decreases in cracks propagating from the interface between the cBN grains and the binder phase by stresses applied to the cutting edge of the drilling tool during use or decreases in propagation of cracking of the cBN grains.

The mean diameter of cBN grains can be determined as follows:

The cross section of a sintered cBN is mirror-finished, and the structure on the mirror-finished surface is observed by scanning electron microscopy (SEM) to capture a secondary electron image. A portion of cBN grains in the captured image is extracted by image processing, and the mean grain diameter is calculated based on the maximum length of each grain determined by image analysis.

The extraction of the portion of cBN grains in the image by the image processing comprises the steps of: displaying the image in monochrome of 256 gradations including 0 in black and 255 in white to clearly distinguish the cBN grains from the binder phase.

A region of about 0.5 μm by 0.5 μm is selected for determining pixel values in cBN grains. The pixel value of cBN is preferably determined by the mean value calculated from at least three different sites in the same image region.

After the binarization process, the cBN grains are separated from each other by a process that separates the contact portions of the cBN grains, for example, by watershed analysis.

The black portions corresponding to cBN grains in the image after the binarization process are subjected to grain analysis, and the maximum length of each grain is defined as a diameter of the grain. For grain analysis to determine the maximum length, the larger one of the two lengths obtained by calculating the Feret diameter of one cBN grain is a maximum length, and this value is defined as a diameter of each grain.

Each grain is then assumed to be an ideal sphere with this diameter, to calculate the cumulative volume as a volume of the grain. Based on this cumulative volume, a graph is drawn with the vertical axis as volume percentage (%) and the horizontal axis as diameter (μm). The diameter at 50% volume fraction corresponds to the mean diameter of cBN grains. This treatment is performed for three observation area, and the mean thereof is defined as a mean grain diameter of cBN (μm).

On this grain analysis, the length per pixel (μm) is preliminarily determined using scale values known by SEM. On an observation area for image processing, a viewing area of about 15 μm by 15 μm is desirable for cBN grains having a mean size of about 3 μm.

The cBN sinter may contain cBN grains in amount content (% by volume). A content less than 65% by volume of cBN grains may cause a hard material to be less generated in the sinter, resulting in reduced chipping resistance in use as a drilling tool. A content exceeding 93% by volume may lead to generation of voids that can be start points of cracking in the sinter, resulting in a reduction in chipping resistance. In order to further emphasize the advantageous effect of this embodiment, the content of cBN grains in the sintered cBN should preferably be in the range of 65 to 93% by volume.

The content of cBN grains in the cBN sinter can be determined as follows: The cross-sectional structure of the cBN sinter is observed by SEM, and the regions of cBN grains in the observed secondary electron image are extracted by image processing, and the areas occupied by cBN grains are calculated by image analysis. The mean value from at least three images is used as a content (% by volume) of the cBN grain. On an observation area for image processing, a viewing area of about 15 μm by 15 μm is desirable for cBN grains having a mean diameters of 3 μm.

Binder Phase:

The ceramic binder phase according to the embodiment can be formed with $Ti_2AlC$ powder, $Ti_3AlC_2$ powder, TiN powder, TiC powder, TiCN powder, and $TiAl_3$ powder.

Regarding $Ti_2CN$ and $TiAl_3$, which are constituents of the binder phase, if the ratio $I_{Ti2CN}/I_{TiAl3}$ is in a range of 2.0 to 30.0, the cBN sinter preferably has excellent abrasion and abrasive wear resistance during rock excavation and high resistance to damage such as chipping due to shock and vibration during rock excavation, where $I_{Ti2CN}$ represents the intensity of a peak assigned to $Ti_2CN$ appearing at 2θ=41.9° to 42.2° and $I_{TiAl3}$ represents the intensity of a peak assigned to $TiAl_3$ appearing at 2θ=39.0° to 39.3° in XRD.

A ratio $I_{Ti2CN}/I_{TiAl3}$ of less than 2.0 causes excess $TiAl_3$ present in the sinter to react with cBN grains to form coarse $TiB_2$ grains, which are start points of fracture during rock excavation. A ratio $I_{Ti2CN}/I_{TiAl3}$ of greater than 30.0 causes $TiAl_3$ to decrease in the sinter, resulting in decreases in adhesion between cBN and the binder phase and in toughness of the sinter.

The intensity $I_{Ti2CN}$ of the $Ti_2CN$ peak and the intensity $I_{TiAl3}$ of the $TiAl_3$ peak are determined by XRD measurement using a Cu tube. In detail, the (111) diffraction peak of cBN is set at 2θ=43.3° as a reference position (angle), the peak between 2θ=41.9° and 42.2° is assigned to $Ti_2CN$ and the peak between 2θ=39.0° and 39.3° is assigned to $TiAl_3$. After background removal, peak search is performed to determine the intensity of each peak.

$Al_2O_3$ (grains) are dispersed in the binder phase, and their mean grain size preferably ranges from 0.9 μm to 2.5 μm for the following reasons:

A mean diameter less than 0.9 μm of $Al_2O_3$ grains causes $Ti_2AlC$ or $Ti_3AlC_2$ grains required for forming $Al_2O_3$ grains to be small, and thus the $Ti_2CN$ and $TiAl_3$ to be reduced, resulting in a reduction in toughness of the cBN sinter. A mean diameter exceeding 2.5 μm of $Al_2O_3$ grains causes cracking to occur readily due to fatigue accumulation originating from $Al_2O_3$ grains in the binder phase, and the toughness of the cBN sinter to be reduced.

In determining the mean grain size of $Al_2O_3$, Al and O elements are mapped by Energy Dispersive X-ray Spectroscopy (SEM-EDX) and positions at which Al and O elements are both detected are identified as $Al_2O_3$. The crystal size of each grains recognized above is determined by image analysis, and then the mean grain size is calculated.

In detail, the cross-sectional structure of the sinter according to the embodiment is observed by SEM to generate a secondary electron image, and a mapping image of the Al and O elements of the same area by EDX is also generated. The overlapped areas of Al and O elements are extracted as $Al_2O_3$ by binarization.

In extraction of the region of each grain in the image by image processing, the image is processed using a monochrome image with 256 gradations of monochrome, with 0 being black and 255 being white in order to clearly identify each grain region in the image.

After the binarization process, the grains are separated from each other using a process that separates the contact portions of the grains, for example, using the watershed described above.

The black regions corresponding to individual grains of the image formed by the binarization process are analyzed, and the volume of each grain is calculated where the maximum length of each grain is defined as a diameter of each grain. The volume is calculated assuming an ideal sphere. On the grain analysis, the length per pixel (μm) is determined in advance using a scale value known by the SEM.

A graph is drawn with the vertical axis as volume percentage (%) and the horizontal axis as diameter (μm) based on the cumulative volume of each grain. The diameter at 50% volume fraction is then defined as a mean diameter of $Al_2O_3$ grains in the observed image. The mean from at least three images is defined as a mean diameter (μm) of $Al_2O_3$ grains dispersed in the binder phase.

A viewing area of about 12 μm by 12 μm is desirable as an observation area used for image processing.

Production of Binder Phase:

The binder phase in the cBN sinter according to the embodiment may be formed as follows:

Prior to ultrahigh-pressure, high-temperature sintering, $Ti_2AlC$ or $Ti_3AlC_2$ with a mean diameter in the range of 1 to 500 μm, for example, is prepared. This material is mixed with other raw materials and heat-treated at a temperature from 250° C. to 900° C. under vacuum. This process can reduce water absorbed on the surfaces of the raw materials without decomposition of coarse $Ti_2AlC$ or $Ti_3AlC_2$ grains into $TiO_2$ and $Al_2O_3$, thereby reducing the amount of $Al_2O_3$ in the sinter after ultrahigh-pressure, high-temperature sintering.

Nonpulverization of $Ti_2AlC$ or $Ti_3AlC_2$ into fine grains allows $Ti_2CN$ and $TiAl_3$ to be formed in the sinter through ultrahigh-pressure sintering without reacting with oxygen inside the coarse grains. $TiAl_3$ reacts with cBN to form $TiB_2$ and AlN, which can increase the bonding strength between cBN and the binder phase. $TiAl_3$, which is an alloy of Ti and Al, left in the sinter can offset a decrease in toughness caused by coarsening of the binder phase. The resulting cBN sinter has high wear resistance and abrasive wear resistance during rock excavation, for example, and high resistance to damage such as chippings caused by shocks and vibrations during rock excavation.

EXAMPLES

Examples will now be described. These Examples should not be construed to limit the present invention.

Sinters of Examples were prepared through Steps (1) to (3):

(1) Preparation of Raw Material Powder

A hard raw material cBN with a mean grain size of 0.5 to 35 μm was used. Raw material powders $Ti_2AlC$ or $Ti_3AlC_2$ were prepared as a binder phase. The $Ti_2AlC$ or $Ti_3AlC_2$ raw materials each has a mean grain diameter of 50 μm. Raw material powders TiN, TiC, TiCN, and $TiAl_3$ were also prepared separately for a binder phase. The mean particle diameters of these separately prepared powders ranged from 0.3 μm to 0.9 μm. The composition of these raw materials is shown in Table 1.

(2) Mixing

These raw powders were mixed and placed together with cemented carbide balls and acetone into a container lined with cemented carbide, then covered with a lid and mixed in the ball mill. The mixing time was 1 hour to avoid finely grinding the raw material powders. It is more preferable to use an ultrasonic stirring device to disintegrate the agglomeration of the raw material powders during mixing, although the device was not used in this example.

(3) Compaction and Sintering

The resulting raw powder mixture was then compacted at a predetermined pressure to produce a green compact, which was subjected to provisional heat treatment. The compact was then charged into an ultrahigh-pressure sintering apparatus and sintered at a pressure of 5 GPa and a temperature of 1600° C. Example cBN sinters (hereafter referred to as "Example Sinters") 1 to 15 were thereby prepared as shown in Table 2.

The provisional heat treatment was performed in a vacuum atmosphere under a pressure of 1 Pa or less, at a temperature between 250° C. and 900° C. or less ("Heating temperature after mixing" in Table 2) for the following reasons: A temperature less than 250° C. causes adsorbed water to insufficiently desorb from the surface of the raw material, and $Ti_2AlC$ or $Ti_3AlC_2$ to react with the moisture adsorbed on the raw material during ultrahigh-pressure and high-temperature sintering and to decompose into $TiO_2$ and $Al_2O_3$. As a result, the amounts of $Ti_2CN$ and $TiAl_3$ remaining in the binder phase of the sinter after ultrahigh-pressure and high-temperature sintering decreases, resulting in a decrease in toughness of the sinter.

A temperature higher than 900° C. causes $Ti_2AlC$ or $Ti_3AlC_2$ to react with oxygen in the adsorbed water and to decompose into $TiO_2$ and $Al_2O_3$ during the provisional heat treatment stage. As a result, less $TiAl_3$ is formed in the binder phase of the sinter, especially after ultra-high pressure and high temperature sintering, and the toughness of the sintered compact is reduced.

Comparative cBN sinters were prepared. Raw material powders were prepared which contain a hard cBN raw material with a mean particle size of 1.0 to 4.0 μm and a $Ti_2AlC$ or $Ti_3AlC_2$ raw material powder for forming a binder phase. The $Ti_2AlC$ and $Ti_3AlC_2$ raw materials had a mean particle diameter of 50 μm. These raw materials were compounded to have compositions shown in Tables 1 and 3, and mixed by ball milling under the same conditions as in Examples.

Each mixture was then compacted under a predetermined pressure, which was then subjected to a provisional heat treatment at a predetermined temperature ("Heating temperature after mixing" in Table 4) in a range of 100° C. to 1200° C. The compact was then charged into an ultrahigh-pressure sintering apparatus and sintered at a pressure of 5 GPa and a temperature of 1600° C. Comparative Example cBN sinters (hereinafter referred to as "Comparative Example Sinters") 1-5 shown in Table 4 were thereby produced.

TABLE 1

| | | Composition (% by volume) | | | | | |
|---|---|---|---|---|---|---|---|
| Type | | $Ti_2AlC$ | $Ti_3AlC_2$ | TiN | TiCN | TiC | $TiAl_3$ |
| Materials for Example | a | 100 | — | — | — | — | — |
| | b | — | 100 | — | — | — | — |
| | c | 80 | — | — | — | — | 20 |

TABLE 1-continued

| | | Composition (% by volume) | | | | | |
|---|---|---|---|---|---|---|---|
| Type | | $Ti_2AlC$ | $Ti_3AlC_2$ | TiN | TiCN | TiC | $TiAl_3$ |
| binder phase* | d | 80 | — | 20 | — | — | — |
| | e | 80 | — | — | 20 | — | — |
| | f | 80 | — | 4 | — | 16 | — |
| | g | 75 | — | — | 20 | — | 5 |

"—": Not compounded.
*Some were also used as materials for Comparative Example binder phase.

TABLE 2

| Type | | cBN Content (% by volume) | cBN Average diameter (μm) | Raw material for binder phase | Heating temperature after mixing (°C.) | Ratio of XRD peak intensity $I_{Ti2CN}/I_{TiAl3}$ | $Al_2O_3$ Average grain size (μm) | Composition of sinter (Identfied by XRD) |
|---|---|---|---|---|---|---|---|---|
| Example sinter | 1 | 74.8 | 2.9 | c | 250 | 2.0 | 2.2 | cBN, $Ti_2CN$, $TiB_2$, $TiAl_3$, $Al_2O_3$, AlN |
| | 2 | 75.3 | 2.2 | c | 600 | 5.6 | 1.9 | cBN, $Ti_2CN$, $TiB_2$, $TiAl_3$, $Al_2O_3$, AlN |
| | 3 | 76.1 | 2.3 | a | 600 | 11.2 | 1.3 | cBN, $Ti_2CN$, $TiB_2$, $TiAl_3$, $Al_2O_3$, AlN |
| | 4 | 74.3 | 2.6 | b | 600 | 9.9 | 1.4 | cBN, $Ti_2CN$, $TiB_2$, $TiAl_3$, AlN (No $Al_2O_3$ peak*) |
| | 5 | 75.4 | 15.8 | a | 900 | 11.8 | 1.3 | cBN, $Ti_2CN$, $TiB_2$, $TiAl_3$, $Al_2O_3$, AlN |
| | 6 | 74.1 | 2.2 | e | 900 | 24.7 | 1.5 | cBN, $Ti_2CN$, $TiB_2$, $TiAl_3$, $Al_2O_3$, AlN |
| | 7 | 75.9 | 2.4 | e | 400 | 30.0 | 1.7 | cBN, $Ti_2CN$, $TiB_2$, $TiAl_3$, $Al_2O_3$, AlN |
| | 8 | 75.2 | 8.1 | d | 600 | 17.7 | 1.6 | cBN, $Ti_2CN$, TiC, $TiB_2$, $TiAl_3$, $Al_2O_3$, AlN |
| | 9 | 70.3 | 1.2 | c | 300 | 2.9 | 2.7 | cBN, $Ti_2CN$, $TiB_2$, $TiAl_3$, $Al_2O_3$, AlN |
| | 10 | 70.5 | 20.6 | b | 800 | 10.1 | 0.7 | cBN, $Ti_2CN$, $TiB_2$, $TiAl_3$, $Al_2O_3$, AlN |
| | 11 | 74.2 | 2.4 | g | 600 | 12.3 | 1.6 | cBN, $Ti_2CN$, TiC, $TiB_2$, $TiAl_3$, $Al_2O_3$, AlN |
| | 12 | 76.2 | 0.5 | f | 800 | 12.6 | 1.6 | cBN, $Ti_2CN$, TiC, $TiB_2$, $TiAl_3$, $Al_2O_3$, AlN |
| | 13 | 85.3 | 2.5 | a | 600 | 10.7 | 1.2 | cBN, $Ti_2CN$, $TiB_2$, $TiAl_3$, $Al_2O_3$, AlN |
| | 14 | 69.8 | 30.0 | a | 600 | 9.6 | 0.9 | cBN, $Ti_2CN$, $TiB_2$, $TiAl_3$, AlN (No $Al_2O_3$ peak*) |
| | 15 | 92.3 | 2.4 | a | 600 | 11.2 | 1.5 | cBN, $Ti_2CN$, $TiB_2$, $TiAl_3$, $Al_2O_3$, AlN |

*$Al_2O_3$ was observed by EPMA.

TABLE 3

| | | Composition (% by volume) | | | |
|---|---|---|---|---|---|
| Type | | $Ti_2AlC$ | $Ti_3AlC_2$ | TiCN | $TiAl_3$ |
| Materials for Comparative Example binder phase | h | 40 | — | — | 60 |
| | i | — | 40 | — | 60 |
| | j | 35 | — | 60 | 5 |

"—": Not compounded.

TABLE 4

| Type | | cBN Content (% by volume) | cBN Average diameter (μm) | Raw material for binder phase | Heating temperature after mixing (°C.) | Ratio of XRD peak intensity $I_{Ti2CN}/I_{TiAl3}$ | $Al_2O_3$ Average grain size (μm) | Composition of sinter (Identified by XRD) |
|---|---|---|---|---|---|---|---|---|
| Comparative Example sinter | 1 | 75.4 | 2.3 | h | 600 | 0.5 | 2.3 | cBN, $Ti_2CN$, $TiB_2$, $TiAl_3$, $Al_2O_3$, AlN |
| | 2 | 74.7 | 2.4 | i | 600 | 0.6 | 2.1 | cBN, $Ti_2CN$, $TiB_2$, $TiAl_3$, $Al_2O_3$, AlN |
| | 3 | 76.1 | 2.2 | j | 600 | 60.8 | 1.3 | cBN, $Ti_2CN$, $TiB_2$, $TiAl_3$, $Al_2O_3$, AlN |
| | 4 | 74.9 | 2.5 | a | 1200 | —* | 1.1 | cBN, $Ti_2CN$, $TiB_2$, $Al_2O_3$, AlN |
| | 5 | 75.2 | 2.2 | j | 100 | 45.6 | 2.6 | cBN, $Ti_2CN$, $TiB_2$, $TiAl_3$, $Al_2O_3$, AlN |

*No $TiAl_3$ peak was found by XRD.

FIG. 1 illustrates an XRD spectrum of Example Sinter 3. The XRD spectrum demonstrates that the sinter has a peak intensity $I_{Ti2CN}$ assigned to $Ti_2CN$ appearing at 2θ=41.9° to 42.2° and a peak intensity $I_{TiAl3}$ assigned to $TiAl_3$ appearing at 2θ=39.0° to 39.3°, where the ratio $I_{Ti2CN}/I_{TiAl3}$ of the peak intensity $I_{Ti2CN}$ to the peak intensity $I_{TiAl3}$ ranges from 2.0 to 30.0.

Tools of Examples 1 to 15 and Comparative Examples 1 to 5 each having a shape in accordance with ISO standard RNGN090300 were then fabricated from the Example Sinters 1 to 15 and Comparative Example Sinters 1 to 5, respectively. These tools were each mounted on an NC lathe and subjected to the following wet cutting test.

Cutting speed: 150 m/min
Cutting depth: 0.3 mm
Feed rate: 0.1 mm/rev
Workpiece material: Granite (from Takine), Shape 150 mm in diameter by 200 mm in length The wear of the cutting edge and the state of the cutting edge were observed at a cutting length (cutting distance) of 800 m, with proviso that the cutting edge was observed every 100 m of cutting length to check chippings and to measure the worn width. At a point the amount of wear exceeded 2000 μm, the cutting test was stopped. The results are shown in Table 5.

TABLE 5

| Tool Type | Wear (State of edge) |
|---|---|
| Example 1 | 1910 μm (No chipping) |
| Example 2 | 1780 μm (No chipping) |
| Example 3 | 1550 μm (No chipping) |
| Example 3 | 1570 μm (No chipping) |
| Example 5 | 1610 μm (No chipping) |
| Example 6 | 1790 μm (Chipping found) |
| Example 7 | 1980 μm (Chipping found) |
| Example 8 | 1590 μm (No chipping) |
| Example 9 | 2150 μm (Chipping found) |
| Example 10 | 1920 μm (Chipping found) |
| Example 11 | 1360 μm (No chipping) |
| Example 12 | 1360 μm (No chipping) |
| Example 13 | 1450 μm (No chipping) |
| Example 14 | 1600 μm (No chipping) |
| Example 15 | 1370 μm (No chipping) |
| Comparative Example 1 | 2100 μm (Chipping found)* |
| Comparative Example 2 | 2400 μm (Chipping found)* |
| Comparative Example 3 | Not measured (broken)* |
| Comparative Example 4 | Not measured (broken)* |
| Comparative Example 5 | 2200 μm (Chipping found)* |

*After 100 m cutting

Table 5 evidentially demonstrates that all the Example tools exhibit low amounts of wear and no chipping indicating excellent abrasive wear resistance and resistance to damage such as chipping caused by impact and vibration to destroy the rock in use as drilling tools. In contrast, all the Comparative Example tools exhibit occurrence of chipping or large amounts of wear at a small cutting length indicating low abrasive wear resistance, and are difficult to use as drilling tools due to chipping.

The disclosed embodiments are illustrative only and are not restrictive in all respects. The scope of the invention is indicated by the claims, not the described embodiments, and is intended to include all modifications within the meaning of the claims and the scope of equivalents.

The invention claimed is:

1. A cBN sinter comprising cubic boron nitride grains and a binder phase,
the binder phase comprising $Ti_2CN$ and $TiAl_3$, wherein the ratio $I_{Ti2CN}/I_{TiAl3}$ of the peak intensity $I_{Ti2CN}$ assigned to $Ti_2CN$ appearing at 2θ=41.9° to 42.2° to the peak intensity $I_{TiAl3}$ assigned to $TiAl_3$ appearing at 2θ=39.0° to 39.3° is in a range of 2.0 to 30.0 in an XRD measurement.

2. The cBN sinter set forth in claim 1, the binder phase comprises dispersed $Al_2O_3$ grains having a mean grain size ranging from 0.9 μm to 2.5 μm.

3. The cBN sinter set forth in claim 2, the binder phase comprises dispersed $Al_2O_3$ grains having a mean grain size ranging from 1.2 μm to 2.5 μm.

* * * * *